United States Patent [19]
Bortkevich et al.

[11] 4,025,987
[45] May 31, 1977

[54] APPARATUS FOR RECOVERING BILE FROM GALL BLADDERS OF SLAUGHTERED BEASTS

[76] Inventors: Leonid Leonidovich Bortkevich, Polyarnaya ulitsa, 40, kv. 9; Alexandr Georgievich Burmistrov, ulitsa Yablochkova, 23, kv. 39; Nikolai Sergeevich Karnet, Zelenodolskaya ulitsa, 9, korpus 5, kv. 46; Boris Alexandrovich Sevostyanov, Leninsky prospekt, 36, kv. 165; Tatyana Grigorievna Filatova, B. Andronievskaya ulitsa, 20, kv. 359, all of Moscow, U.S.S.R.

[22] Filed: Oct. 2, 1975

[21] Appl. No.: 618,967

[52] U.S. Cl. .................................................. 17/43
[51] Int. Cl.² ...................................... A22C 17/14
[58] Field of Search ............... 17/43, 1 R, 15, 25, 17/45; 99/506, 507, 508, 509; 426/518, 479, 489

[56] References Cited
UNITED STATES PATENTS 792,262   6/1905   Hay et al. .............................. 17/43

Primary Examiner—Louis G. Mancene
Assistant Examiner—James D. Hamilton
Attorney, Agent, or Firm—Steinberg & Blake

[57] ABSTRACT

The apparatus is intended for use in the meat industry. It incorporates a chamber containing gall bladders. The chamber has a loading port for feeding the gall bladders thereinto and an unloading port through which the gall bladders are discharged after processing. Two opposite walls of the chamber, one of them being made aslant, are provided with slots passing through which are knives mounted on a carriage. The carriage is linked up with a drive causing it to move back and forth. Disposed under said chamber is a perforated trough discharged whereinto through the unloading port are the gall bladders lanced in the chamber. The apparatus also incorporates a conveyor for disposing of the empty gall bladders. Accommodated below the perforated trough is a container accumulating the bile dripping from the chamber and said trough.

The apparatus assures a more or less complete recovery of high-quality bile and enables the automation of the process of its recovery. The apparatus also eliminates the possibility of accidents.

10 Claims, 12 Drawing Figures

APPARATUS FOR RECOVERING BILE FROM GALL BLADDERS OF SLAUGHTERED BEASTS

The present invention relates to the meat industry, and more specifically to apparatus for recovering bile from gall bladders of slaughtered beasts. An apparatus embodied in accordance with the present invention may be used to advantage in the production of bile which is a valuable raw material used in the preparation of a variety of drugs such as allakhol, kholenzim and the like.

There are widely known various knives used in lancing gall bladders of slaughtered beasts by hand. In manipulating with such knives operators fail to attain the requisite efficiency particularly when slaughtered beasts are dressed on a conveyor where a number of manual operations are to be performed in succession. On lancing the gall bladders with said knives, bile is reluctant to leave all the folds formed due to lancing and consequently not all the bile is recovered. This leads to considerable losses of a rather valuable raw material, said losses being particularly noticeable when slaughtered beasts are being dressed in big numbers.

Furthermore, in dressing slaughtered beasts on a conveyor with a number of manual operations followed in succcession there is practically no time for the bile to be drained from the lanced gall bladders completely, for bile has a thick consistency and consequently displays a low rate of flow. This adds to the losses of bile incurred in the course of recovering bile from gall bladders.

In lancing gall bladders manually by means of any of the knives known there is one more important aspect which is the provision of absolute safety for the operator or otherwise accidents are likely to occur during the manual lancing of gall bladders.

Another disadvantage stemming from the use of known knives in lancing gall bladders by hand is the fact that the bile so recovered is of inferior quality, being mixed with the slime washed down from the interiors of gall bladders by the flow of bile when the operator squeezes the gall bladder.

Another essential disadvantage associated with the use of knives for manual lancing of gall bladers is the difficulty experienced in providing normal sanitary conditions at the workplace.

At present there is a permanent demand for bile recovered from gall bladders and used for various medical purposes such as the preparation of various drugs. This poses the problem of complete recovery of quality bile under the conditions of comparatively high labour productivity and productive efficiency.

At present there are known no apparatus for the recovery of bile from gall bladders of slaughtered beasts.

It is the main object of the present invention to provide an apparatus for recovering bile from gall bladders of slaughtered beasts which will enable a more complete recovery of bile under the conditions of comparatively high labour productivity.

Another object of the present invention is to provide an apparatus which will eliminate the possibility of accidents during the operation of recovering bile, add to the productive efficiency and create normal sanitary conditions.

A further object of the present invention is to provide an apparatus which will allow to produce bile of higher than ever before quality.

Said objects are attained by providing an apparatus for recovering bile from gall bladders of slaughtered beasts comprising: a casing; a chamber containing the gall bladders processed, said chamber being formed by walls placed on said casing; a loading port and an unloading port of said chamber; gates which serve to open and close said loading and unloading ports; a plurality of slots cut in the opposite walls of said chamber so as to register one with another; at least one of the walls of said chamber placed aslant so that the chamber narrows towards said unloading port; a plurality of knives for lancing gall bladders; a carriage whereon said knives are mounted; guides rigidly attached to said casing and accommodating said carriage so that in the course of moving said carriage the knives pass through the respective slots in opposite walls of said chamber; a drive moving said carriage back and forth; mechanisms for actuating each of said gates of the loading and unloading ports, said mechanisms being movably linked up with said carriage drive; a perforated trough disposed under the unloading port of said chamber and serving to receive the gall bladders lanced by said knives; a bile container disposed under said perforated trough.

Said apparatus allows to automate the process of recovering bile from gall bladders so that in the case of necessity the productivity of labour in coping with said operation of handling slaughtered beasts can be increased, all accidents can practically be eliminated, the productive efficiency increased by a considerable amount and also the sanitary conditions at the workplace can be made normal. The apparatus enables a more complete recovery of bile which also displays a comparatively better quality.

It is preferred that the drive causing the carriage to travel back and forth incorporates a power cylinder and a distributing mechanism placing the spaces inside said power cylinder in communication with a means of feeding a fluid under a pressure and, furthermore, the piston rod of the power cylinder is connected to said knife-carrying carriage. A drive arranged on these lines assures safety for the personnel when working in premises under the conditions of high humidity, being more safe than an electric motor which may be a source of hazard should the insulation become damaged. In addition, the drive disclosed is characterized by a simple layout and is reliable in operation.

It is also preferable that in the apparatus for recovering bile from gall bladders of slaughtered beasts the mechanism for moving said gate of the loading port in said chamber incorporates a lever whose fulcrum pin is secured to the body of said power cylinder and one of the lever arms is spring-loaded so as to hold said gate in the closed position, and further the mechanism incorporates a connecting rod attached to said gate and to the other arm of said lever, the movable connection between this lever and said drive being accomplished by means of a detent secured to the piston rod of said power cylinder and exerting its action on said lever in the course of piston rod travel so as to move said gate which opens said loading port.

Furthermore, it is preferable that the mechanism for moving said gate of the unloading port in said chamber incorporates a lever whose fulcrum pin is secured to said casing and the mechanism also incorporates a connecting rod attached to said gate and said lever, the movable connection between this lever and said drive being accomplished by means of detents secured to the piston rod of said power cylinder at a distance apart from each other which is in fact equal to the length of gate stroke; these detents exert their action on said lever in the course of piston rod travel so as move said gate which closes and opens said unloading port in said chamber.

A layout of the mechanisms for moving the gates of the loading and unloading ports in this manner appears to be the most simple one, required minimum cost for manufacture and giving adequate reliability in operation.

The invention may include a conveyor disposed inside said casing between said bile container and said chamber for the purpose of handling the gall bladders lanced by said knives and discharged into said perforated trough. Said conveyor comprises: upper and lower rods arranged horizontally inside said casing one above the other with provision to reciprocate; blades disposed between the upper rod and perforated trough and each of the blades being attached to the lower rod with provision for pivoting in a vertical plane and linked up with the upper rod by means of a slot piercing the blade and accommodating a pin rigidly attached to the upper rod; said upper rod being movably linked up with said drive to reciprocate the carriage; said lower rod movably being linked up with said upper rod so that the latter is somewhat ahead of the lower rod in the course of travel; and means for slowing down the movement of said lower rod.

By virtue of said conveyor the period of draining the bile left behind in the gall bladders lanced is extended. This feature is of particular value, for there is left sufficient time for a complete recovery of the bile accumulated in the folds of gall bladders after the bulk of bile has been drained in the course of discharging the gall bladders into the perforated trough. A conveyor arranged on said lines is helpful in handling gall bladders which are a slimy load commonly awkward to handle.

It is expedient that said knives are disposed in said carriage in rows staggered so that the knives form a checkerboard pattern. The knives arranged in this way lance each of the gall bladders more than once irrespective of its position in said chamber. This not only contributes to a more complete recovery of bile from the gall bladders but also improves the quality of bile, for no mixing of bile with slime takes place because no slime is carried away from the interiors.

It is further expedient that the apparatus is provided with a hopper topping said chamber above the loading port and communicating with same. The hopper serves to accumulate gall bladders which are fed from the hopper into the chamber for processing.

It is also expedient that the bile container is made integrally with the casing, this plan rendering the layout the most simple one.

The disclosed apparatus for recovering bile from gall bladders of slaughtered beasts embodied in accordance with the present invention assures a fairly complete recovery of bile displaying a higher quality and enables the automation of the process of bile recovery which is a factor remarkably adding to labour productivity and productive efficiency. Furthermore, said apparatus completely eliminates the possibility of accidents in coping with the process of bile recovery and allows to provide normal sanitary conditions at the workplace.

Other features and advantages of the invention will become evident from the following description of a preferred embodiment of the invention when this description is read in conjunction with the accompanying drawings in which:

FIG. 8 is a view of the conveyor according to the invention;

Figure 2:
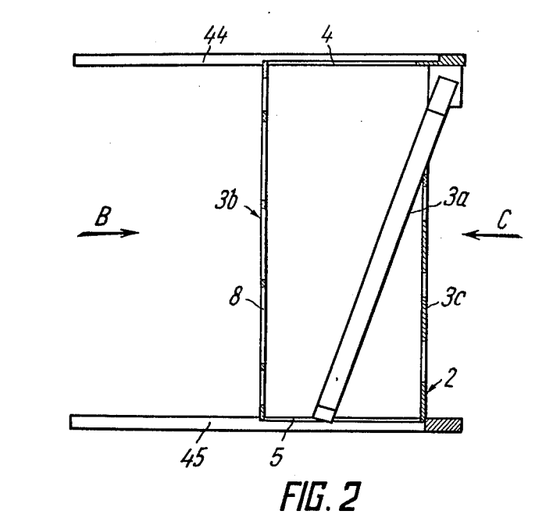
FIG. 2 is a sectional elevation of the chamber containing the gall bladders processed and embodied according to the invention.
Figure 3:
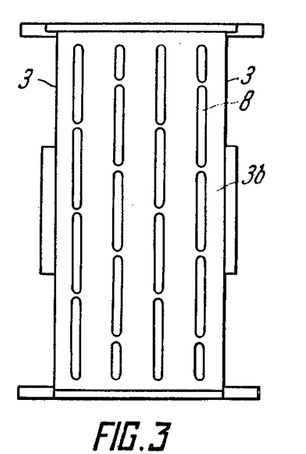
FIG. 3 is a view of FIG. 2 in the direction of arrow B.

The disclosed apparatus for recovering bile from gall bladders of slaughtered beasts consists of a casing 1 (FIG. 1) and a chamber 2 accommodating gall bladders A, said chamber being formed by walls 3 (FIG. 3) and walls 3a, 3b (FIGS. 1 and 2) placed on the casing 1. The chamber 2 (FIG. 1) is provided with a loading port 4 wherethrough gall bladders enter the chamber 2 and with an unloading port 5 serving to discharge both the processed gall bladders and bile. A gate 6 opens and closes the loading port 4 of the chamber 2 whereas a gate 7 performs the same function with respect to the unloading port 5.

Figure 5:
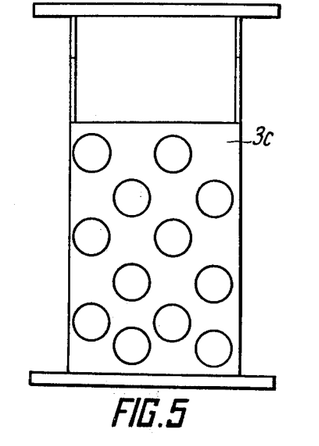
FIG. 5 is a view of FIG. 2 in the direction of arrow C.

One of the walls, i.e., the wall 3a of the chamber 2, is made aslant so that the chamber narrows toward the unloading port 5. Behind the slanting wall 3a there is provided a wall 3c (FIGS. 2 and 5) which adds to the rigidity of the chamber 2 and is pierced with ports through which the slanting wall 3a is washed down in the course of operating the apparatus.

Figure 4:
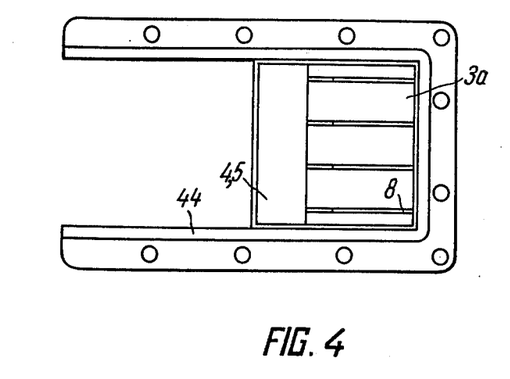
FIG. 4 is a plan view of FIG. 2.

In the preferred embodiment of the present invention the two opposite walls 3a and 3b of said chamber are provided with slots 8 (FIGS. 2, 3 and 4) which register one with another. The slots 8 are arranged in rows (in the preferred embodiment of the invention the slots are disposed in four rows) and spaced a distance apart which is by far greater than the width of the slots, six to ten times in the example disclosed. In the wall 3b (FIG. 3) the slots are arranged four or five per row and run all the way down the wall. In the wall 3a (FIG. 4) the slots 8 run continuously all the way down the wall and are of a width somewhat smaller than that of the slots in the wall 3b so that no gall bladder is squeezed through a slot and the wall 3a remains always unchoked.

Figure 6:
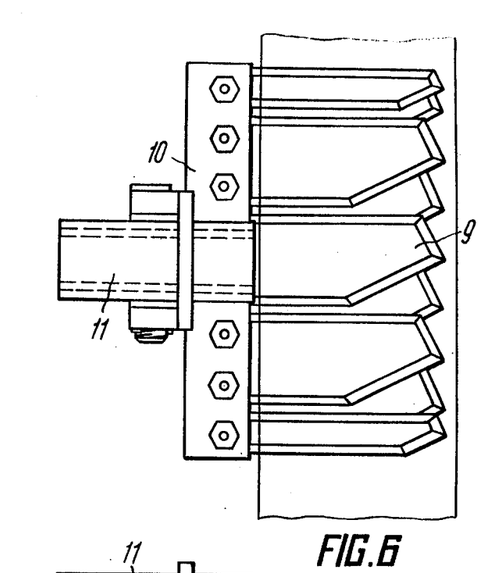
FIG. 6 is a view of the carriage according to the invention with knives fitted thereto.
Figure 7:
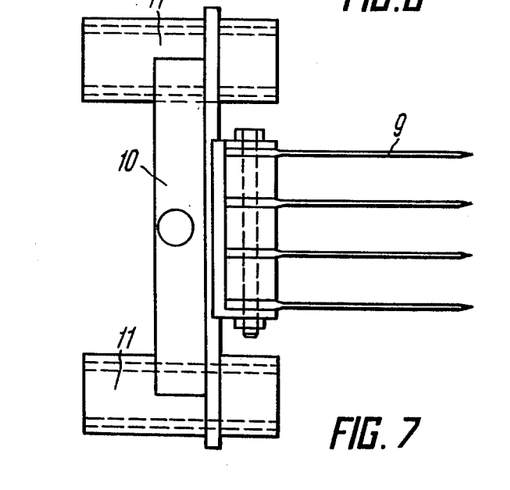
FIG. 7 is a plan view of FIG. 6.

Knives 9 (FIGS. 1, 6 and 7) for lancing the gall bladders A are fitted to a carriage 10 in rows staggered so that the knives form a checkerboard pattern registering with the slots 8 (FIGS. 3 and 4) in the opposite walls 3a and 3b of the chamber 2. In the preferred embodiment of the invention, the knives 9 are given the shape of thin blades with sharp edges, the thickness of the knives being somewhat smaller than the width of the slots 8 so that the knives can freely pass trough said slots. Rigidly attached to the carriage 10 (FIGS. 6 and 7) in the preferred embodiment of the invention there are bushings 11 adapted to move on guides 12 (FIG. 1) linked up with the casing 1 through the chamber 2. The guides 12 assure that the carriage 10 moves precisely in the prescribed direction so that the knives 9 are free to pass through the slots 8 (FIGS. 3 and 4) in the walls 3a and 3b of the chamber 2.

A drive 13 (FIG. 1) serving to reciprocate the carriage 10 incorporates a power cylinder 14 whose piston rod 15 is connected to said carriage. The drive 13 also incorporates a distributing mechanism 16 which places the spaces inside the power cylinder in communication with a means of feeding a fluid under a pressure (not shown). Used as the distributing mechanism 16 can be a contrivance of any known design suitable for this purpose. The fluid used in the preferred embodiment of the invention is water.

Figure 1:
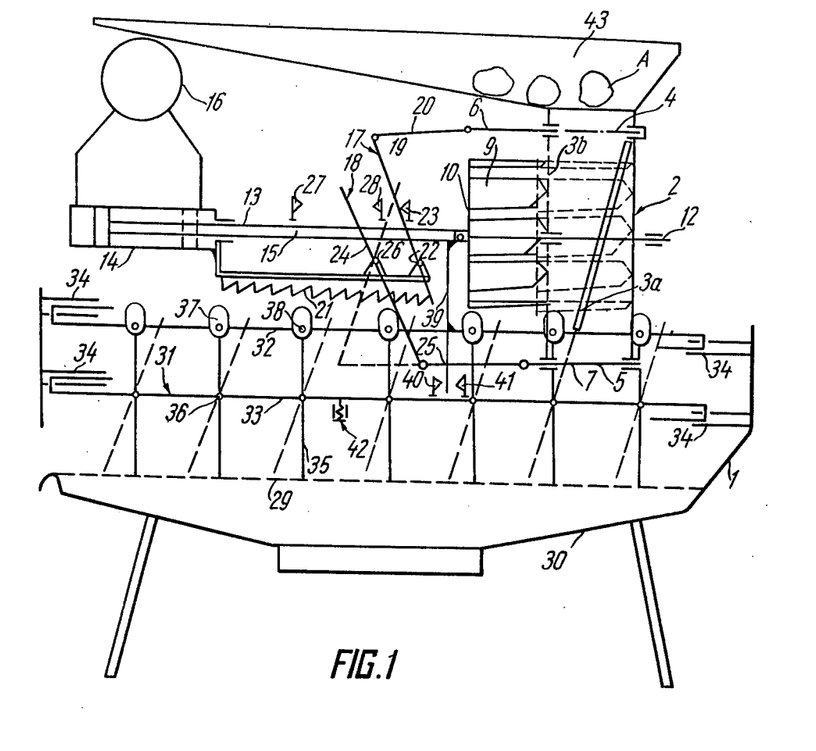
FIG. 1 is a schematic diagram of the apparatus for recovering bile from gall bladders in accordance with the invention.

The apparatus in accordance with the invention incorporates a mechanism 17 serving to actuate the gate 6 of the loading port 4 and a mechanism 18 which moves the gate 7 of the unloading port 5.

The mechanism 17 comprises: a lever 19, a connecting rod 20 attached to one arm of the lever 19 and to the gate 6, and a spring 21 connected to the other arm of the lever 19 with one of its ends and secured to the body of the power cylinder 14 with the other end. The sping 21 serves the purpose of closing the loading port 4 with the gate 6 and holding the gate in the position when the port 4 is closed. A fulcrum pin 22 of the lever 19 is held fast to the casing 1. The lever 19 is movably linked up with the drive 13 by means of a detent 23 secured to the piston rod 15 of the power cylinder 14, said detent serving to act upon the lever 19 when said piston rod is in the course of travel so as to shift the gate 6 and open the loading port 4.

The mechanism 18 for moving the gate 7 of the unloading port 5 comprises a lever 24 and a connecting rod 25 attached to one arm of the lever 24 and to the gate 7. A fulcrum pin 26 of the lever 26 is held fast to the casing 1. The lever 24 is movably linked up with the drive 13 by means of detents 27 and 28 secured to the piston rod 15 of the power cylinder 14 some distance apart. The detent 27 acts upon the lever 24 so as to open the gate 7 of the unloading port 5 when the piston rod 15 moves in one direction. The detent 28 acts upon the lever 24 so as to close the gate 7 of the unloading port 5 when the piston rod 15 moves in the opposite direction.

Contained inside the casing 1 is a perforated trough 29 disposed under the unloading port 5 of the chamber 2 and serving to receive the gall bladders A lanced with the knives 9. A bile container 30 placed under the perforated trough 29 is made integrally with the casing 1.

Figure 9:
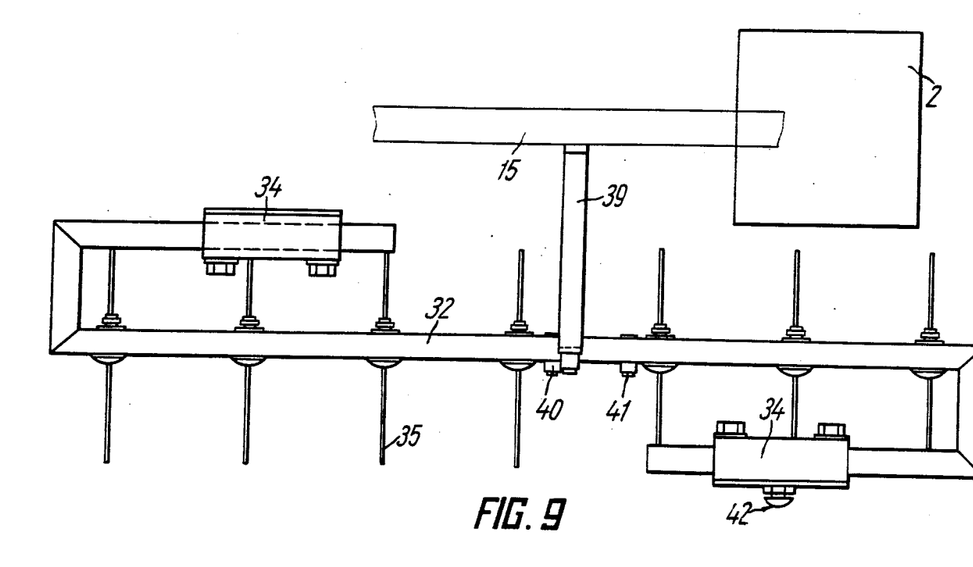
FIG. 9 is a plan view of FIG. 8.
Figure 10:
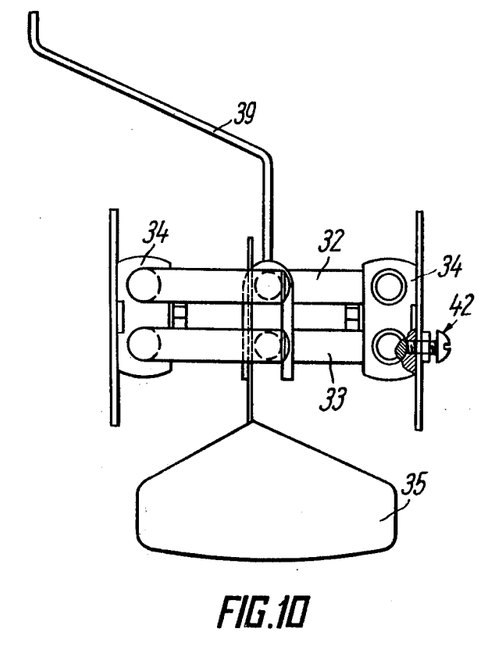
FIG. 10 is a view of FIG. 8 in the direction of arrow D.

Contained in the casing 1 between the bile container 30 and the chamber 2 is a conveyor 31 (FIGS. 1, 8, 9 and 10) which serves the purpose of transporting the gall bladders A lanced with the knives 9 and then discharged into the perforated trough 29. The conveyor 31 consists of two horizontal rods arranged one above the other and consequently termed an upper rod 32 and a lower rod 33 which are fitted inside the casing 1 so that they can reciprocate along guides 34 rigidly attached to the casing. The conveyor also incorporates blades 35 disposed between the upper rod 32 and the perforated trough 29. Each of the blades 35 is secured to the lower rod 33 with provision for pivoting in the vertical plane by means of a pin 36 (FIG. 8). Each of the blades is also secured to the upper rod 32 by means of a slot 37 accomodating a pin 38 which is rigidly attached to the upper rod 32, and this latter rod is movably linked up with the piston rod 15 of the power cylinder 14, a constituent components of the drive 13, through the intermediary of a lever 39 (FIGS. 8, 9 and 10). In the preferred embodiment of the present invention, the lower portion of the lever 39 (FIG. 10) has a fork embracing the lower rod.

The lower rod 33 is movably linked up with the upper rod 32 through detents 40 and 41 (FIGS. 8 and 9) which are attached to the lower rod so as to interact with the lever 39. Said movable linkage between the rods 32 and 33 makes for an advance of the upper rod 32 with respect to the lower rod 33 in the course of their travel. Furthermore, the lower rod 33 is fitted with a contrivance 42 (FIGS 8, 9 and 10) which slows down said rod all the time. In the example of the preferred embodiment of the invention disclosed, said contrivance consists of a screw with a locknut which passes through the casing and is screwed into one of the guides 34 so as to come abutting with its tip against the lower rod 33.

Topping the chamber 2 above the loading port 4 is a hopper 43 (FIG. 1) which communicates with the chamber 2 and is intended to accumulate gall bladders preparatory to processing and feeding them into the chamber 2 for lancing and bile recovery. The bottom of hopper is inclined so as to facilitate the feeding of the gall bladders toward the loading port 4 due to gravity.

The process of recovering bile from gall bladders of slaughtered beasts takes place in the apparatus disclosed and embodied in accordance with the present invention on the following lines.

Gall bladders A separated from livers of slaughtered beasts are placed into the hopper 43. If the loading port 4 is open, the gall bladders A freely enter the chamber due to gravity. If, however, the loading port 4 is closed by the gate 6, the gall bladders A accumulate in the hopper.

When the fluid pressure fed from a source through the distributing mechanism 16 is admitted into the corresponding space of the power cylinder, the piston rod 15 moves leftward as indicated in FIG. 1 and performs its back stroke at the end of which detent 23 acts upon the lever 19 of the mechanism 17. As a result, the lever 19 pivots about its fulcrum pin 22 against the action of the spring 21 and moves the gate 6 through the intermediary of the connecting rod 20 so that the gate, travelling along the guide 44 (FIGS 2 and 4) formed by the flanges of the hopper 43 and those of the chamber 2, opens the loading port 4. At this instant the unloading port 5 is closed by the gate 7 and gall bladders are fed from the hopper 43 into the chamber 2.

Next, the fluid pressure-fed from the source through the distributing mechanism 16 is admitted into the other space of the power cylinder 14, causing the piston rod 15 to move rightward as indicated in FIG. 1 and perform its forward stroke. At the beginning of this stroke the detent 23 releases the lever 19 of the mechanism 17 and said lever, pivoting about its fulcrum pin 22 due to the action of the spring 21, moves the gate 6 along the guide 44 so that the gate 6 closes the loading port 4. The gall bladders are thus contained in the closed space of the chamber 2.

When the piston rod 15 is on the move, the carriage 10 is also travelling along the guides 12, being linked up with the piston rod. The knives 9 mounted on said carriage enter the slots 8 in the wall 3b of the chamber 2, press the gall bladders A to the inclined wall 3a, lance the gall bladders and pass through the corresponding slots in the inclined wall. In travelling as indicated the knives pass through the entire space of the chamber with the result that all the gall bladders contained therein are lanced more than once, this fact contributing to a more complete recovery of bile.

When the piston rod completes its forward stroke, the detent 27 acts upon the lever 24 of the mechanism 18 and said lever, pivoting about its fulcrum pin 26, moves the gate 7 through the intermediary of the connecting rod 25 over the guide 45 (FIGS. 2 and 4) formed by the flanges of the chamber 2 and those of the casing 1. The gate 7 opens the unloading port 5, enabling the bile drained from the gall bladders to reach the perforated trough 29 through the open unloading port and then to drip from the trough into the bile container 30.

At the next stage, the fluid pressure-fed from the source through the distributing mechanism 16 is admitted into the corresponding space of the power cylinder with the result that the piston rod starts moving leftward as indicated in FIG. 1, beginning its back stroke. The carriage 10, travelling along the guides 12, withdraws the knives 9 from the chamber 2. The gall bladders which remain on some of the knives being pierced therewith are removed from these knives when they reach the wall 3b and drop into the perforated trough 29 through the open unloading port 5. A further movement of the piston rod 15 causes the detent 28 to pivot the lever 24 of the mechanism 18 about its fulcrum pin 26. The lever 24 moves the gate 7 over the guide 45 through the intermediary of the connecting rod 25 so that the unloading port 5 is closed.

When the piston rod 15 completes its stroke, the detent 23 acts upon the lever 19 of the mechanism 17 with the result that the gate 6 moves over the guide 44 and opens the loading port 4. A new batch of gall bladders A from those which have accumulated in the hopper in the meantime enters the chamber 2 and then the cycle is repeated.

Figure 11:
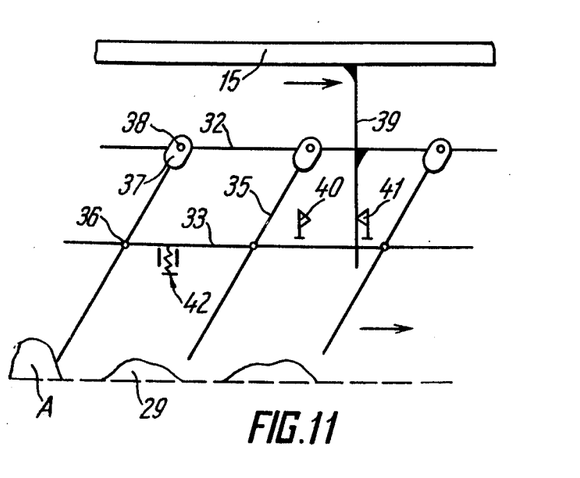
FIG. 11 is a view of the conveyor in the position corresponding to running in the forward direction.
Figure 12:
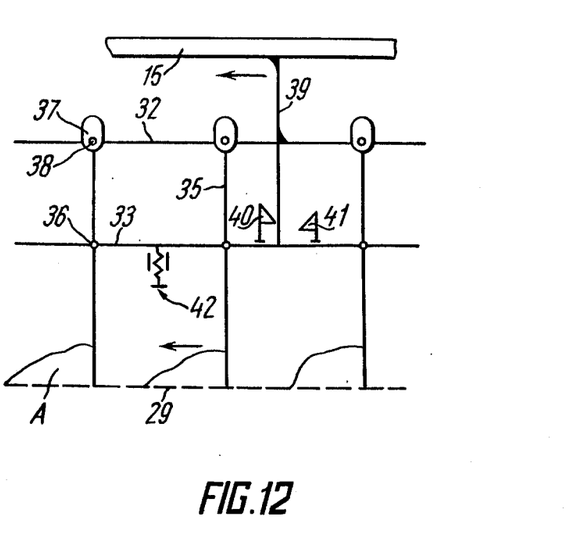
FIG. 12 is a view of the same conveyor or in the position corresponding to running in the reverse direction.

The lanced gall bladders A dropped into the perforated trough 29 are handled by the conveyor 31 which discharges them from the apparatus. At the end of the forward stroke of the piston rod 15 the blades 35 assume an inclined position as indicated in FIG. 11 and the lever 39 acts upon the detent 41. At the beginning of the back stroke of the piston rod 15 the upper rod 32 moves over the guides 34 leftward as indicated in FIG. 8 due to the action of the lever 39. The lever 39 leaves the detent 41 and the blades pivot about their fulcrum pins 36. The pins 38 fitted to the upper rod 32 slide in the slots 37 of the blades 35, causing the blades to pivot until the lever 39 comes abutting against the detent 40. At this instant the blades are in the vertical position as indicated in FIG. 12. To prevent the lower rod from moving integrally with the blades whose tips travel with the upper rod, the contrivance 42 constantly slows down the lower rod 33 by means of the frictional forces coming into play when the screw contacts the rod. As soon as the lever 39 exerts its action on the detent 40, the lower rod starts moving in the guides 34 integrally with the upper rod, overcoming the resistance of the slowing down contrivance 42 and that of the gall blades entrained by blades 35. Both rods move with the blades through the guides 34 until the piston rod 15 completes its back stroke. When the piston rod 15 starts the forward stroke, the lever 39 leaves the detent 40 and the lower rod is immovable, being held down by the contrivance 42, whereas the upper rod moves in advance of the lower rod with the piston rod 15 until the lever 39 comes abutting against the detent 41. During this interval of time, the blades 35 pivot about their fulcrum pins 36 through a specified angle. After that the lower rod 33 also starts moving with the upper rod until the forward stroke of the piston rod 15 is completed. During this movement the lower tips of the blades 35 pass clear of the gall bladders in the perforated trough 29. At the beginning of the back stroke of the piston rod 15 the lever 39 leaves the detent 41 and the above cycle of conveyor operation is repeated. In course of a cycle, the lanced gall bladders travel down the conveyor a distance equal to the spacing between two adjacent blades. In travelling over the perforated trough, the lanced gall bladders shed the bile left in the folds and this bile drips into the bile container 30.

It is thus apparent that with the above-described apparatus of the invention for recovering bile from gall bladders, the chamber 2 has an upper inlet port 4 and a lower outlet port 5 which is smaller than the inlet port, this chamber being defined by upright walls which include at least a pair of opposed walls, namely walls 3a and 3b, which converge toward each other in a downward direction from the upper inlet port to the lower outlet port. At least one of these walls, namely the wall 3b, is formed with a plurality of slots passing therethrough, and in alignment with these slots are the plurality of knives 9 which have substantially pointed ends directed toward the slots and which are carried by a carriage means 10 guided for reciprocating movement by the guide means 11, 12 in such a way that during this reciprocating movement the knives pass through the slots for piercing into gall bladders received in the chamber between the walls thereof which converge downwardly. A drive means 13, formed by the fluid-pressure means 14, 15, is operatively connected with the carriage means 10 for reciprocating the latter. A pair of gate means 5 and 6 respectively cooperate with the lower outlet port and upper inlet port for opening and closing the same, these gate means being respectively connected with the drive means by a pair of linkage means which operate the gate means, a hopper 43 communicating with the upper inlet port 4 for supplying the gall bladders A thereto.

The support means formed by the casing 1 supports not only the chamber 2 but also beneath the lower outlet port thereof the apertured wall 29 through which the bile flows to be received in the collecting means 30 which is integral with the support means 1. Between the apertured wall 29 and the outlet port 5 is the conveyor means 31 for conveying the gall bladders away from the apertured wall 29 onto which the gall bladders fall after passing through the port 5. This conveyor means includes the horizontal rods 32 and 33 guided by the guide means 34 for reciprocating movement, the upper rod 32 being connected with the reciprocating drive means 13 by way of the member 39 which extends between projections 40 and 41 fixed to the lower rod so as to move the latter only when engaging one or the other of these projections, the contrivance 42 forming a means frictionally engaging the lower rod to retard the movement thereof except when positively moved by engagement of member 39 with one of the projections 40 or 41. This conveyor means further includes the several blades 35 which are pivotally connected intermediate their ends to the lower rod 33 and which have the pin-and-slot connections 37, 38 with the upper rod 32, so that through this structure it is possible for the blades 35 to swing in the manner described above back and forth for bringing about the stepwise movement of the gall bladders away from the perforated wall 29.

A pilot model of the disclosed apparatus for recovering bile from gall bladders of slaughtered beasts has successfully passed all the tests which have proved that a throughput as high as 6,000 gall bladders per 8 hours is a practical possibility. The tests have also shown that the apparatus disclosed weighing not over 35 kg yields quality bile and its recovery is a more complete one than ever before.

The use of the apparatus disclosed offers such advantages as higher productive efficiency, improved sanitary conditions and the elimination of accidents in lancing gall bladders of slaughtered beasts.

What is claimed is:

1. In an apparatus for recovering bile from gall bladders, upright wall means defining a chamber having an upper inlet port and a lower output port smaller than said upper inlet port, said upright wall means including at least a pair of opposed wall portions which converge downwardly from said upper inlet port to said lower outlet port, and said upright wall means being formed with slots passing therethrough, a plurality of knives situated in alignment with said slots for extending therethrough into the interior of the casing and having substantially pointed ends for piercing into gall bladders which enter into the casing through said upper inlet thereof and which progress downwardly through the casing to move out of the latter through said lower outlet thereof, carriage means carrying said knives, guide means guiding said carriage means for reciprocating movement so that said knives will reciprocate through said slots for piercing through gall bladders in said casing, drive means operatively connected with said carriage means for reciprocating the latter, and means situated beneath said outlet port for receiving the pierced gall bladders which pass through said outlet port.

2. The combination of claim 1 and wherein said knives are arranged in rows and wherein the knives of one row are staggered with respect to knives in another row.

3. The combination of claim 1 and wherein said opposed converging wall portions of said upright wall means are both formed with slots for receiving said knives.

4. The combination of claim 1 and wherein the means situated beneath said outlet port for receiving the gall bladders includes a substantially horizontal wall formed with apertures and onto which the gall bladders are free to fall from said outlet port while bile can flow through said apertures, collecting means situated beneath said apertured wall for collecting the bile which flows through said apertures, and conveyor means situated between said outlet port and apertured wall for conveying gall bladders away from the space between said outlet port and apertured wall.

5. The combination of claim 4 and wherein said conveyor means is situated between said outlet port and said apertured wall for advancing gall bladders in a stepwise manner along said apertured wall.

6. The combination of claim 5 and wherein said conveyor means includes substantially horizontal upper and lower rods, guide means guiding said rods for reciprocating movement, and an elongated member connected to said drive means and to one of said rods for reciprocating said one rod, a plurality of conveyor blades extending to the region of said apertured wall for engaging gall bladders thereon and pivotally connected to while being distributed along the other of said rods, said blades having pin-and-slot connections with said one rod, and a retarding means cooperating with said other rod for frictionally retarding movement thereof, said other rod having a pair of projections between which said member connected to said drive means extends and situated in the path of movement of said member so that said member will engage first one and then the other of said projections for reciprocating said other rod with respect to said one rod to bring about swinging movement of said blades to provide the stepwise movement of the gall bladders along said apertured wall.

7. The combination of claim 1 and wherein a gate means cooperates with said lower outlet port for closing and opening the same, and linkage means operatively connected between said drive means and gate means for operating said gate means.

8. The combination of claim 1 and wherein a gate means cooperates with said upper inlet port for closing and opening the same, and linkage means extending between and operatively connected to said gate means and drive means for operating said gate means in response to operation of said drive means.

9. The combination of claim 1 and wherein a hopper communicates with said upper inlet port for supplying gall bladders thereto.

10. The combination of claim 1 and wherein said drive means includes a piston-and-cylinder assembly for operating in response to fluid under pressure.

* * * * *